(12) United States Patent
Tang et al.

(10) Patent No.: US 12,385,790 B2
(45) Date of Patent: Aug. 12, 2025

(54) TEMPERATURE MEASUREMENT CALIBRATION METHOD WITHOUT INTERFERENCE OF SHUTTER OF THERMAL IMAGING MODULE

(71) Applicant: NATIONAL CHUNG SHAN INSTITUTE OF SCIENCE AND TECHNOLOGY, Taoyuan (TW)

(72) Inventors: Shiang-Feng Tang, Taoyuan (TW); Shun-Lung Yen, Taoyuan (TW); Kuo-Jen Chang, Taoyuan (TW); Hsin-Chang Chen, Taoyuan (TW)

(73) Assignee: NATIONAL CHUNG SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 457 days.

(21) Appl. No.: 17/844,758

(22) Filed: Jun. 21, 2022

(65) Prior Publication Data

US 2023/0408342 A1 Dec. 21, 2023

(51) Int. Cl.
*G01J 5/80* (2022.01)
*G01J 5/00* (2022.01)
*G01J 5/02* (2022.01)
*G01J 5/53* (2022.01)

(52) U.S. Cl.
CPC .............. *G01J 5/808* (2022.01); *G01J 5/0205* (2013.01); *G01J 5/53* (2022.01); *G01J 5/80* (2022.01); *G01J 2005/0077* (2013.01)

(58) Field of Classification Search
CPC .. G01J 5/808; G01J 5/0205; G01J 5/53; G01J 5/80; G01J 2005/0077; G01J 5/48; G01J 5/70; G01J 5/52
IPC ................ G01J 5/80,5/02, 5/53, 2005/00, 5/48, G01J 5/70, 5/52
See application file for complete search history.

(56) References Cited

U.S. PATENT DOCUMENTS

| 6,786,634 | B2 * | 9/2004 | Hashimoto | ............... G01J 5/06 |
| | | | | 374/127 |
| 8,391,632 | B2 * | 3/2013 | Oakley | ..................... G06T 5/70 |
| | | | | 382/274 |
| 11,205,018 | B2 * | 12/2021 | Acun | ...................... G06F 21/73 |

FOREIGN PATENT DOCUMENTS

JP 05312653 A * 11/1993

* cited by examiner

*Primary Examiner* — Laura Martin
*Assistant Examiner* — Julia Fitzpatrick (57) ABSTRACT

A temperature measurement calibration method without interference of a shutter of a thermal imaging module comprises steps: at a temperature of a core chip of a thermal imaging module, obtaining a response value generated by measuring a blackbody temperature after the shutter is started at a frame time; performing a linear regression analysis of the response value to obtain a correction response value equation; inputting the response value into the correction response value equation; and obtaining a correction response value of measuring the blackbody temperature.

5 Claims, 7 Drawing Sheets

```
┌─────────────────────────────────────────────┐
│ obtaining, from a sensing core chip of the thermal
│ imaging module, a plurality of response values
│ generated by measuring a blackbody temperature over a
│ plurality of frame times after starting a shutter of the
│ thermal imaging module, wherein the sensing core chip
│ is at a specific temperature, and the plurality of response  ─── S1
│ values exhibit sharp changes upon starting the shutter,
│ the plurality of response values are divided into a
│ plurality of rising segment response values and a
│ plurality of descending segment response values
└─────────────────────────────────────────────┘
                        ↓
┌─────────────────────────────────────────────┐
│ performing a fitting regression on the plurality of rising
│ segment response values and the plurality of descending
│ segment response values to derive a rising segment       ─── S2
│ correction response value equation and a descending
│ segment correction response value equation
└─────────────────────────────────────────────┘
                        ↓
┌─────────────────────────────────────────────┐
│ inputting the plurality of rising segment response
│ values and the plurality of descending segment
│ response values into the rising segment correction       ─── S3
│ response value equation and the descending segment
│ correction response value equation
└─────────────────────────────────────────────┘
                        ↓
┌─────────────────────────────────────────────┐
│ obtaining a plurality of correction response
│ values for calibrating the plurality of response         ─── S4
│ values of measuring the blackbody temperature
└─────────────────────────────────────────────┘
                        ↓
┌─────────────────────────────────────────────┐
│ calibrating the plurality of response values using the
│ plurality of correction response values to eliminate
│ the sharp changes caused by starting the shutter,        ─── S5
│ thereby calibrating a plurality of temperatures
│ measured by the thermal imaging module
└─────────────────────────────────────────────┘
```

TEMPERATURE MEASUREMENT CALIBRATION METHOD WITHOUT INTERFERENCE OF SHUTTER OF THERMAL IMAGING MODULE

BACKGROUND OF THE INVENTION

1. Field of the Invention

The present disclosure relates to a temperature measurement calibration method, and in particular to a temperature measurement calibration method without interference of a shutter of a thermal imaging module.

2. Description of the Related Art

When the general thermal imaging module is used to measure temperature, it is usually necessary to boot and wait for 15 to 20 minutes, so that the thermal imaging module reaches a certain working temperature, that is, after the temperature of the sensing core (e.g., focal plane array, FPA) chip of the thermal imaging module is relatively stable, the temperature measurement function can be performed; at the same time, it is also necessary to ensure that the temperature accuracy of image quality within room temperature to 100° C. is maintained at ±5° C. or ±5% through uniformity and single temperature point shutter calibration, but the measurement temperature drift caused during the periodic single temperature point shutter calibration is one of the main causes of poor measurement temperature accuracy. In order to solve the above shortcomings, there are generally three temperature calibration methods.

Method one: the most commonly used correction technology is that after the temperature of thermal imaging module is stable, a single temperature point shutter correction is tried not to carry out, but the temperature offset in the temperature measurement equipment is directly used, manual fine-tuning is performed, the method is suitable for the measurement field with low ambient temperature variation, the forehead thermometer calibrated and approved by the standard weights and measures unit is used as the initial reference temperature, manual temperature offset fine-tuning is performed, the most serious disadvantage is the limitation of the measurement field, not applicable to the field with higher ambient temperature variation and the target with wider measurement temperature range.

Method two: the temperature measurement system is introduced with a set of calibrated temperature sensing elements, the adjustment and calibration is performed before leaving factory, 20 minutes after booting are used to wait for the system to stabilize, and then a single temperature point shutter calibration procedure is started, there are two purposes, the first: maintaining image uniformity, the second: the temperature calibration sensing element is fixed as near the shutter as possible, so that the shutter temperature is not affected by the internal and external temperature, the detected shutter temperature at this time is converted into a digital response value (to obtain the corresponding relation of the accurate shutter temperature and the digital response value), that is, to obtain the digital conversion outputting response value (expressed in counts) of the sensing core chip, and the response value corresponding to the shutter temperature is recorded to the system storage unit, that is, the temperature calibration procedure before the system leaving factory is completed. When the temperature measurement system boots to make the operating temperature of the sensing core chip reach a constant (about 20 minutes), the single temperature point shutter calibration procedure is started before the measurement, at this time the shutter sensing temperature will correspond to a new set of digital response values, when the shutter is used in the case of low ambient temperature variation, it can be linearly compensated by the temperature offset, which is the so-called automatic temperature offset calibration in the general industry, when the technology is used in the range of larger ambient temperature variation, the measurement is not accurate because of the large error.

Method three: all the influencing factors are considered as far as possible, experiments are used to simulate the complex orthogonal high-order feature transformation matrix function in different scenarios, numerical calculations are performed, the temperature measurement system only needs the scenario ambient temperature, target distance, operating temperature of the sensing core chip and other information, certainly, the information needs to be input by additional temperature and distance sensors, and is combined with the sampling results for different temperature ranges before leaving factory to obtain the orthogonal high-order feature transformation matrix function of the empirical equation, and to calculate the correct measurement temperature value.

Although method three can meet the temperature measurement of a wide range of temperature variation, the main problem of this type of technology is that it requires a large matrix calculation, often requires a high-performance computing unit, and needs to assume that there is no correlation between different parameters, so that the operation is simplified. Although the method can greatly improve the temperature measurement accuracy of a wide temperature range, the complex empirical operation matrix causes the operation chip to be extremely burdensome, the difficulty of sampling under complete conditions in advance, the long pre-calibration time, and the addition of different ambient temperature sensors, optical shutter peripheral temperature sensors, sensing core operating temperature sensors and ranging units and other elements is needed to cooperate with the temperature measurement module, which is more suitable for a fixed high-level temperature measurement system with high-efficiency calculation units, and is not applicable to the temperature accuracy calibration of handheld thermometers.

BRIEF SUMMARY OF THE INVENTION

It can be seen from the prior art that the current general thermal imaging module needs to be booted and waits for the operating temperature of the sensing core chip to reach a constant before it is truly operated, or it needs to be calibrated by a large number of numerical operations to correctly measure the temperature.

Further, in view of the problems encountered in the prior art, in the short range of the optical shutter performing a single temperature point image uniformity calibration, the sensing core chip detects that the response value will fluctuate sharply in a short period of time after starting and stopping the optical shutter, resulting in the estimated temperature measurement value will also be inaccurate with the sharp fluctuation of the response value in a short period of time. Thus, in order to shorten the warm-up waiting time of thermal imaging module and reduce a large number of numerical operations, the present disclosure provides a temperature measurement calibration method without interference of a shutter of a thermal imaging module, using a very simplified and universal fitting quadratic curve double-interval joint equation, performing nonlinear automatic temperature offset operation, accurate and stable temperature values are quickly obtained by real-time operation.

To achieve the above objective, the present disclosure provides a temperature measurement calibration method without interference of a shutter of a thermal imaging module, comprising steps: (S1) at a temperature of a core chip of a thermal imaging module, obtaining a response value generated by measuring a blackbody temperature after the shutter is started at a frame time; (S2) performing a linear regression analysis of the response value to obtain a correction response value equation; (S3) inputting the response value into the correction response value equation; and (S4) obtaining a correction response value of measuring the blackbody temperature.

Preferably, the response value is divided into a rising segment response value and a descending segment response value, the correction response value equation is divided into a rising segment correction response value equation and a descending segment correction response value equation.

Preferably, the correction response intensity value equation: the rising segment correction response value equation: $y = C + 0.00438x^2 - 1.20399x + 20$, where y is the rising segment correction response value, C is the rising segment response value of the blackbody radiation, and x is the cumulative value of the frame time after starting the shutter.

Preferably, the descending segment correction response value equation: $y1 = C1 - 0.000072(x-180)^2 + 0.11539(x-180) - 50$, where y1 is the descending segment correction response value, C1 is the descending segment response value of the blackbody radiation, and x is the cumulative value after starting the shutter.

Preferably, a first frame time to a 180th frame time after starting the shutter is a time interval of the rising segment response value.

Preferably, a 181th frame time to a 1080th frame time after starting the shutter is a time interval of the descending segment response value.

The present disclosure proposes a temperature measurement calibration method without interference of a shutter of a thermal imaging module, a linear regression analysis and numerical calculation law are used to obtain a fitting correction compensation equation, real-time operations can be performed by using a computing chip module loaded with software or a computer or microprocessor, in order to quickly obtain accurate and stable temperature values, and effectively reduce the time of waiting for the system to stabilize after the thermal imaging module booting. The present disclosure does not need to increase the volume of the system, energy consumption or complex hardware insulation device, may also be applied to thermal imaging pixels and a two-point temperature calibration, dead point substitution, can reduce the hardware insulation and heat dissipation design complexity of temperature measurement thermal imager system, system volume and energy consumption in the subsequent process, can directly reduce manufacturing costs without changing the system hardware architecture.

DETAILED DESCRIPTION OF THE INVENTION

The implementation of the disclosure is further described by the specific embodiments as below, and a person having ordinary skill in the art can easily understand other advantages and effects of the present disclosure by the content of the specification.

Figure 1:
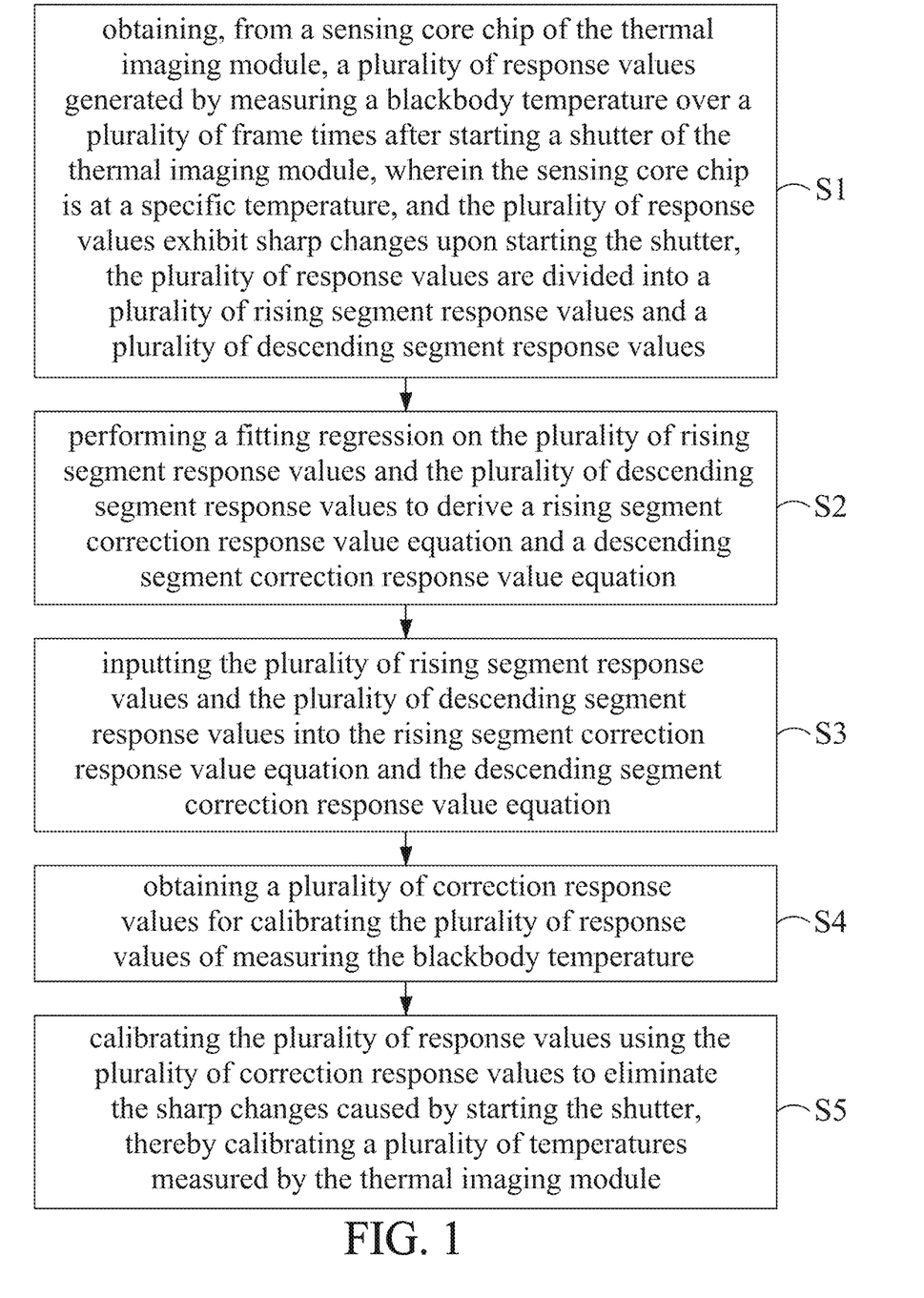
FIG. 1 is a flow chart of a temperature measurement calibration method without interference of a shutter of a thermal imaging module of the present disclosure.

Referring to FIG. 1, FIG. 1 is a flow chart of a temperature measurement calibration method without interference of a shutter of a thermal imaging module of the present disclosure, the temperature measurement calibration method without interference of a shutter of a thermal imaging module comprises steps: step S1, at a temperature of a core chip of a thermal imaging module, obtaining a response value generated by measuring a blackbody temperature after the shutter is started at a frame time. Step S2, performing a linear regression analysis of the response value to obtain a correction response value equation. Step S3 inputting the response value into the correction response value equation. Step S4 obtaining a correction response value of measuring the blackbody temperature.

Figure 2:
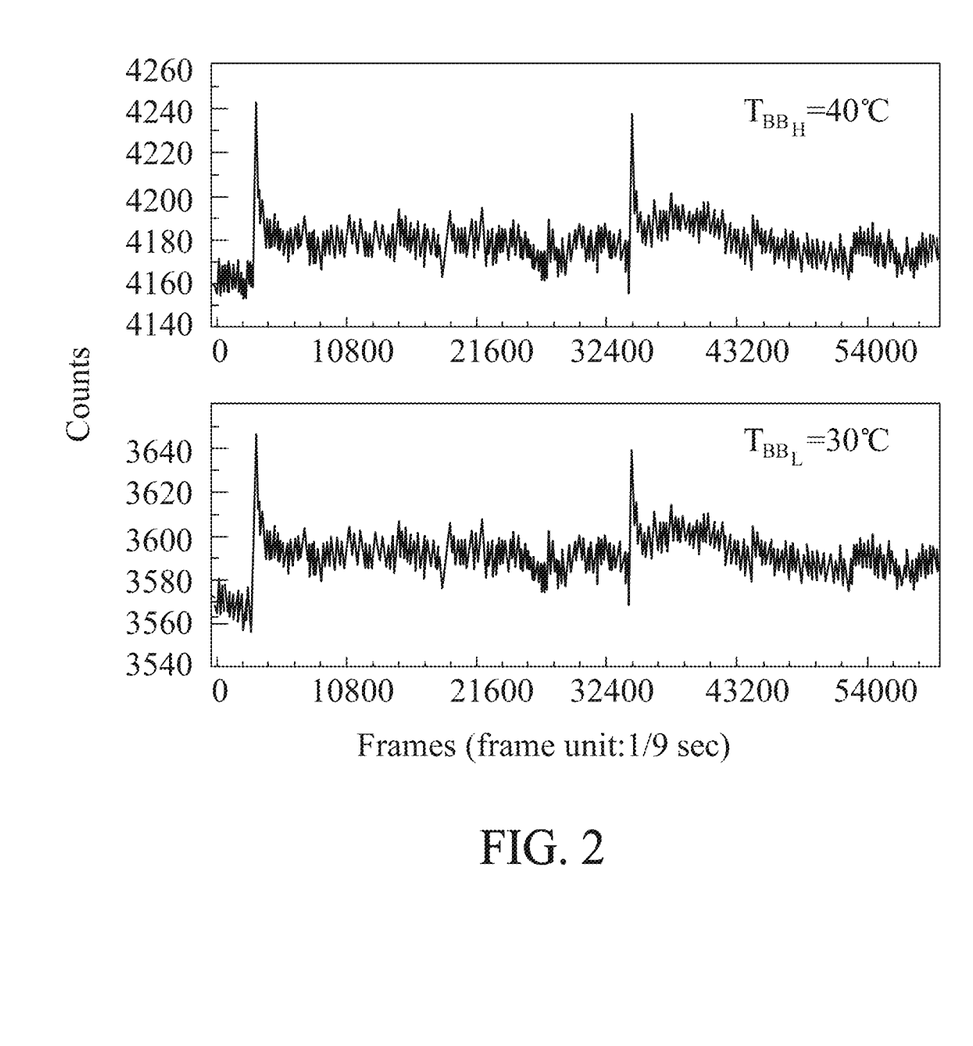
FIG. 2 shows relation graphs of the thermal imaging module measuring the 40° C. and 30° C. standard blackbody radiation source digital response value and time.

In more detail, FIG. 2 can be used, when the general thermal imaging module performs temperature calibration, a single temperature point shutter calibration period (that is, the optical shutter actuation period) is first set to 3600 seconds, and a frame frequency is set to 1/9 second (1 hour to start and stop the optical shutter once; 32400 frames time interval=1 hr), and it is assumed that the usage scenario will be about 1 meter away from the target to be measured in the future, so a standard blackbody radiation source is measured at a distance of 1 meter, the temperatures are respectively 30° C. and 40° C., while the digital response value monitored by each frame time (herein represents the average of the pixel digital response value of each frame) is recorded, as shown in FIG. 2, after a single temperature point shutter calibration is performed (optical shutter actuation), it causes that the digital response value changes sharply within a short time period, and the digital response value can be performed an inverse operation through the Planck thermal radiation curve approximation formula to obtain a surface temperature value of the standard blackbody radiation source, thus, as shown in FIG. 2, the standard blackbody radiation source with the surface temperature of 30° C. and 40° C. is measured after the single temperature point shutter calibration is performed, it causes that the digital response value of the temperature sensing core FPA chip changes sharply during a short period of time (there will be a surge curve every 32400 frames time interval).

Figure 3:
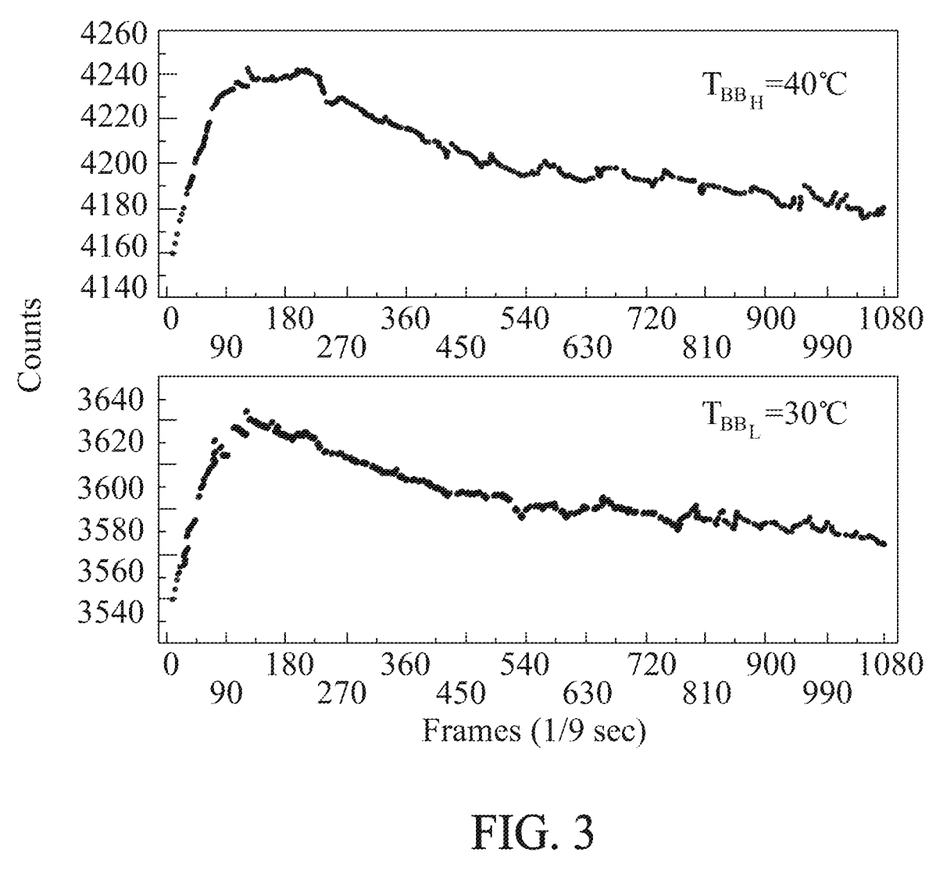
FIG. 3 shows relation graphs of the thermal imaging module measuring the 40° C. and 30° C. standard blackbody radiation source digital response value and time within 1080 frames time interval after calibration.

As shown in FIG. 3, in order to observe in detail the interval of sharp change in the digital response value of the temperature sensing core FPA chip after the optical shutter is actuated, the interval of the sharp change in the response value is enlarged to observe, and the period is 120 seconds (equivalent to 1080 frames time interval; the number of frames of time=9 frames/sec), and the digital response value relation graphs of the 30° C. and 40° C. standard blackbody temperatures are measured. The change trends of the measured 30° C. and 40° C. standard blackbody digital response values obtained from FIG. 3 are consistent, that is, when the optical shutter is actuated, the initial value of the response value will be lower than that of the steady state, and then rise sharply (the first time interval) close to the highest value after approaching 180 frame time periods, and then occur a turn (the second time interval), and then gradually drop to the standard blackbody digital response value measured before the shutter actuation.

Figure 4:
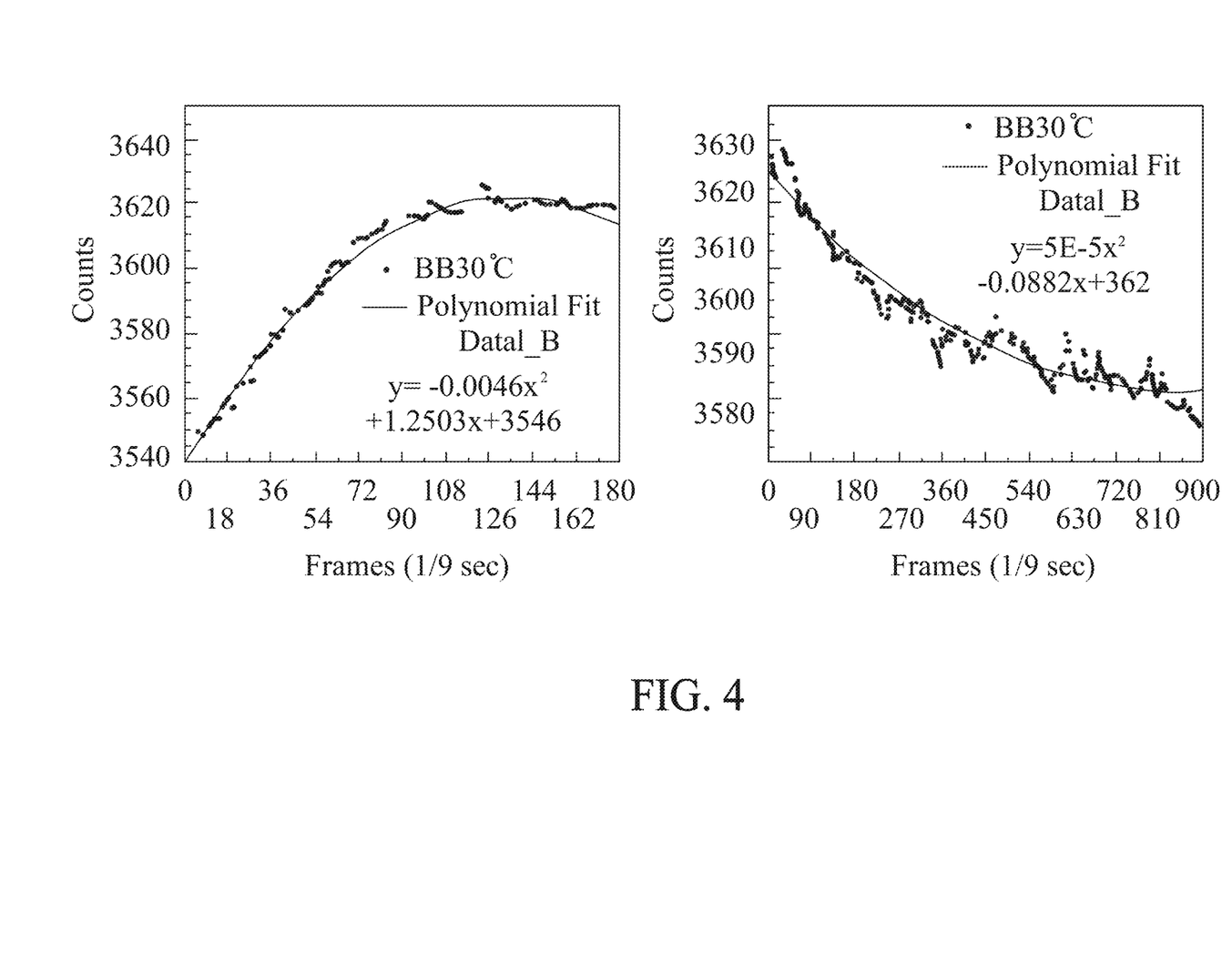
FIG. 4 shows the rising segment and the descending segment of measuring 30° C. standard blackbody radiation source response value, the response value performs fitting regression by using the second-order function.
Figure 5:
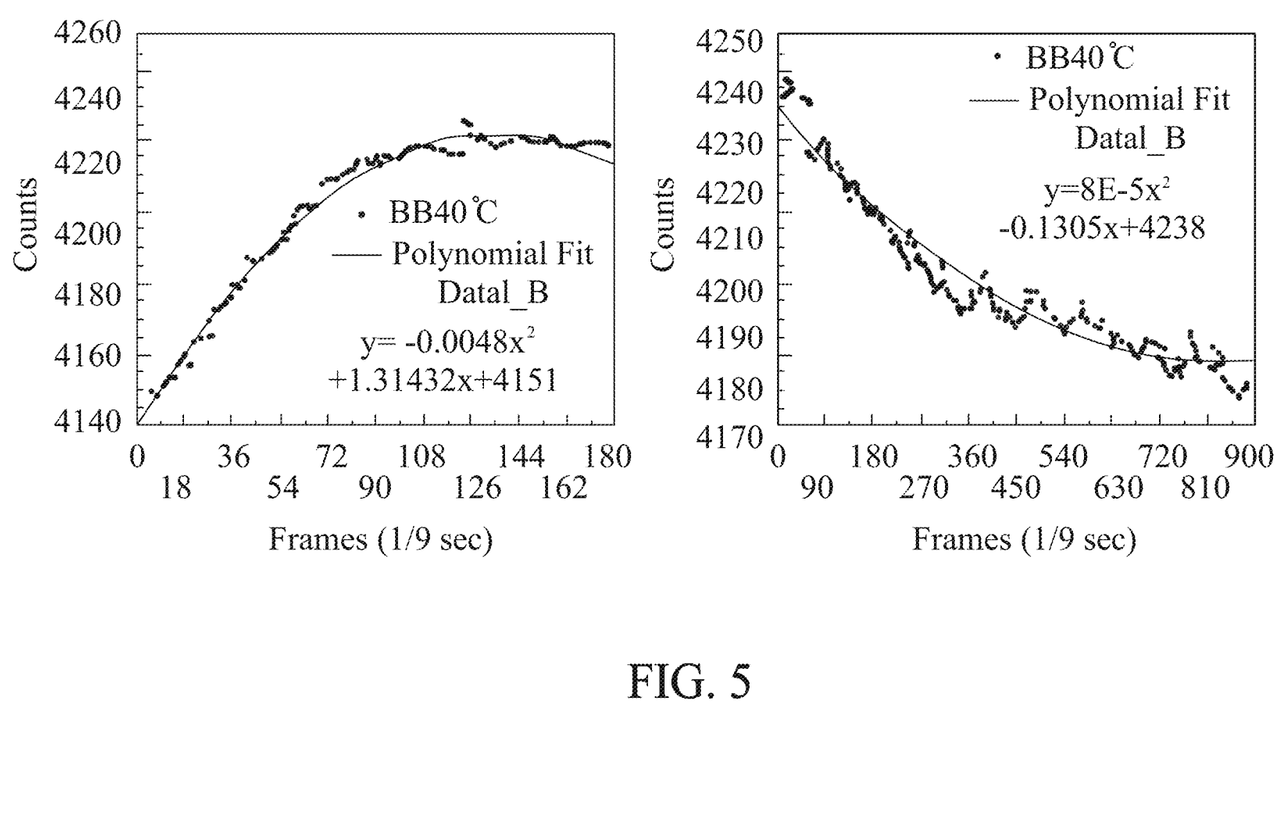
FIG. 5 shows the rising segment and the descending segment of measuring 40° C. standard blackbody radiation source response value, the response value performs fitting regression by using the second-order function.

In order to make the operation of the present disclosure more simplified compared to the prior art under a certain measurement accuracy for reducing the use of high-performance computing unit, the present disclosure divides the relation curve into two regions at 180th frame (where the change is gentle) that are respectively a rising segment response value and a descending segment response value, and analyzes the curve trend, performs fitting regression by using the second-order function to meet the average degree of fitting ($R^2$) value up to 0.96 or more, and finally, finds the coefficients of each order, measures the digital response values of 30° C. and 40° C. standard blackbody, and performs a joint analysis for the double-interval of the fitted quadratic curve at 1080 frame time periods, as respectively shown in FIG. 4 and FIG. 5.

From FIG. 4, after the measured response value of the rising segment of the standard blackbody radiation intensity performs fitting regression by using the second-order function, the correction function of the rising segment is $y=-0.0046x^2+1.2503x+3546$; after the measured response value of the descending segment of the 30° C. standard blackbody radiation intensity performs fitting regression by using the second-order function, the correction function of the descending segment is $y=5e^{-5}x^2-0.0882x+362$.

From FIG. 5, after the measured response value of the rising segment of the 40° C. standard blackbody radiation intensity performs fitting regression by using the second-order function, the correction function of the rising segment is $y=-0.0048x^2+1.3142x+4151$; after the measured response value of the descending segment of the 40° C. standard blackbody radiation intensity performs fitting regression by using the second-order function, the correction function of the descending segment is $y=8e^{-5}x^2-0.1305x+4238$.

By the above embodiments, at different temperatures, performing fitting by using the second-order function can be used to correct the digital response value of a single temperature point shutter calibration, by the coefficient information of the correction function obtained above, taking the average of the fitting coefficients of each order, a fitting correction compensation equation can be obtained, wherein the rising segment correction response intensity value equation: $y=C+0.00438x^2-1.20399x+20$; the descending segment correction response intensity value equation: $y1=C1-0.000072(x-180)^2+0.11539(x-180)-50$, where y is the rising segment correction response value, C is the rising segment response value of the measured standard blackbody radiation, y1 is the descending segment correction response value, C1 is the descending segment response value of the measured standard blackbody radiation, and x is the cumulative value of the frame time after starting the shutter.

Figure 6:
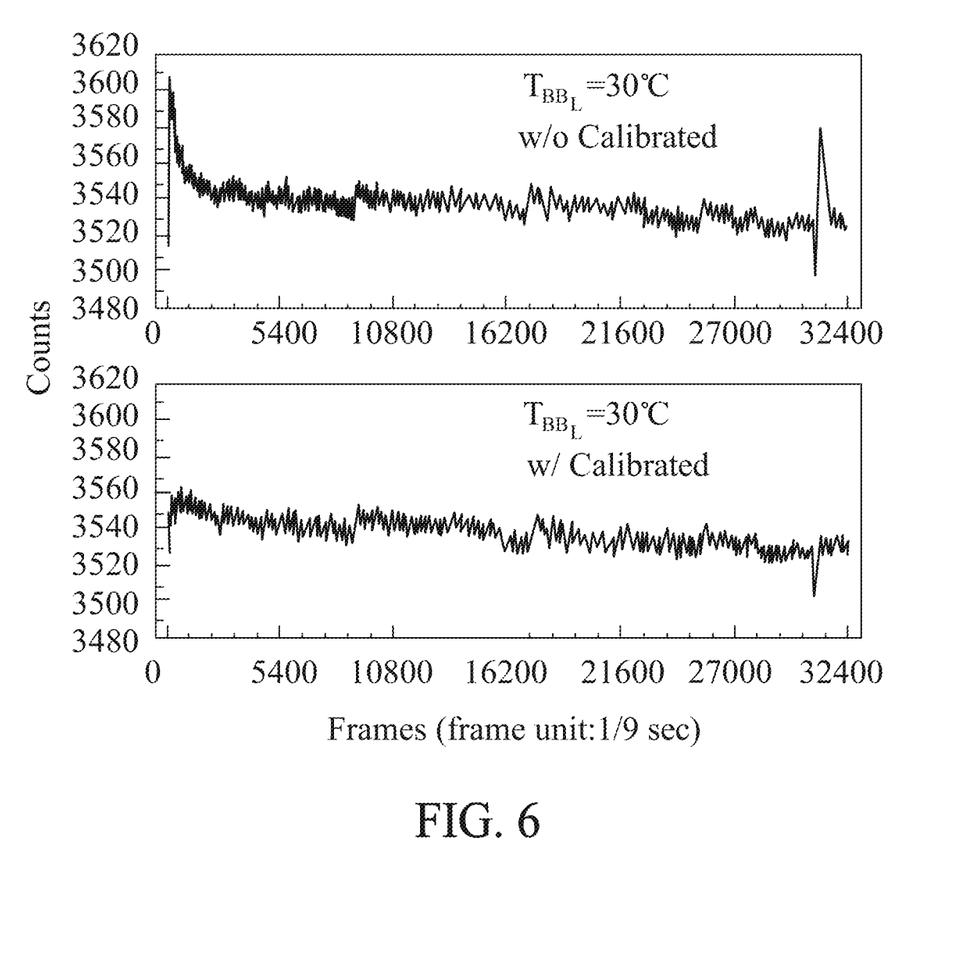
FIG. 6 shows graphs of the 30° C. standard blackbody radiation source digital response value outputting before and after temperature measurement calibration.
Figure 7:
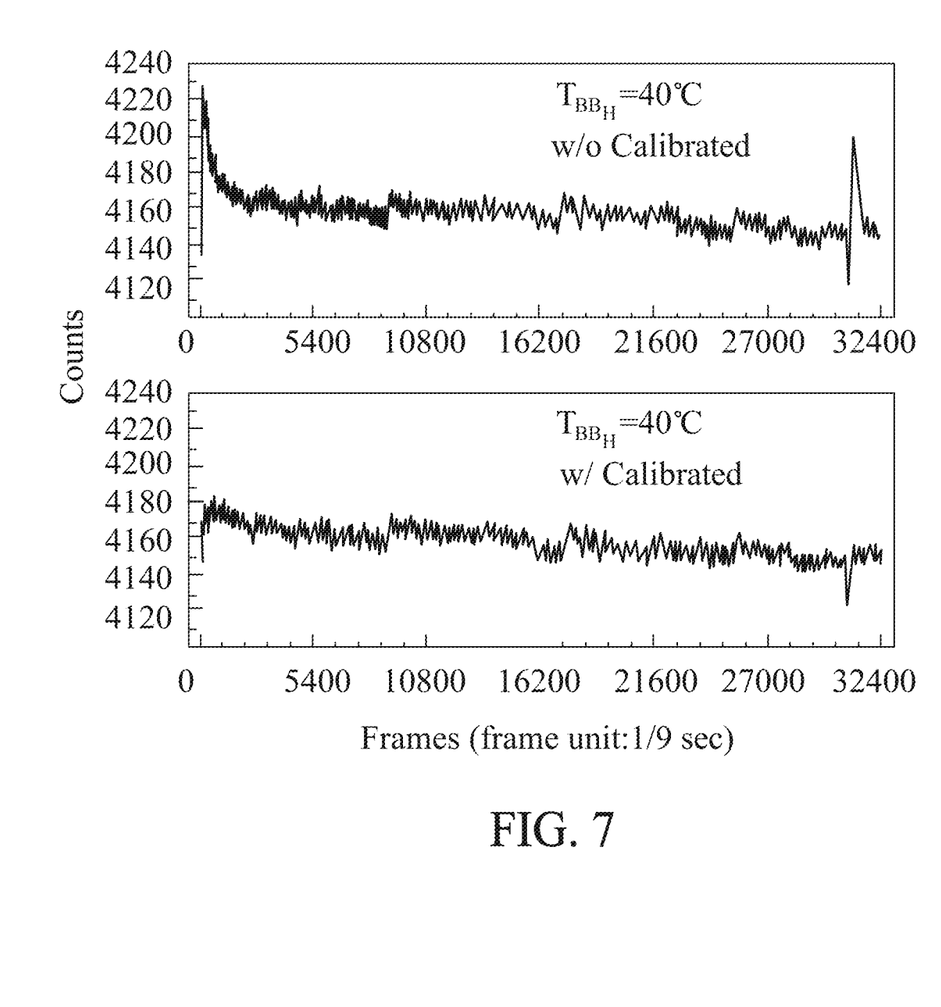
FIG. 7 shows graphs of the 40° C. standard blackbody radiation source digital response value outputting before and after temperature measurement calibration.

The digital response values of 30° C. and 40° C. standard blackbody sources are measured by using the fitting correction compensation equation, the experimental results of the use of fitting correction compensation and no fitting correction compensation over a long period of time are compared as shown in FIG. 6 and FIG. 7. In the case that the single temperature point shutter calibration (optical shutter actuation) is performed every one-hour time period, the use of the fitting correction compensation equation can effectively improve the sharp change in the digital response value.

Further, in order to confirm that the correction compensation equation has an effect on other thermal imagers, the present disclosure uses two different thermal imaging modules (Group A and Group B) to verify, each thermal imaging module uses the fitting correction compensation equation of the present disclosure, and combines with the thermal radiation calibration regression coefficient in the thermal radiation physical Planck curve approximation formula and then carries out inverse operation (CC), and only performs the thermal radiation calibration regression coefficient in the thermal radiation physical Planck curve approximation formula and then carries out inverse operation (UN), the numerical results of one hour (each a single temperature point shutter calibration before and after that) are analyzed as follows.

The number A type measures the actual temperature value of the 30° C. standard blackbody source by using the fitting correction compensation equation, and the minimum temperature value part is corrected from 29.29° C. to 29.40° C.; the maximum temperature value part is corrected from 31.24° C. to 30.43° C., and measures the actual temperature value of the 40° C. standard blackbody source, and the minimum temperature value part is corrected from 39.40° C. to 39.41° C.; the maximum temperature value was corrected from 41.12° C. to 40.34° C., and the relevant values of average value (AVG), standard deviation (STD), minimum (MIN), maximum (MAX) and median (MED) are shown in Table 1.

TABLE 1

Temperature measurement accuracy table after correction of the correction equation

| | | $T_{BB}$ 30° C. | | $T_{BB}$ 40° C. | |
| --- | --- | --- | --- | --- | --- |
| | | UN | CC | UN | CC |
| A | AVG | 30.00 | 30.00 | 40.00 | 40.00 |
| | STD | 0.17 | 0.12 | 0.16 | 0.11 |
| | MIN | 29.29 | 29.40 | 39.40 | 39.41 |
| | MAX | 31.24 | 30.43 | 41.12 | 40.34 |
| | MED | 30.00 | 30.00 | 39.98 | 40.00 |

The number type B measures the actual temperature value of the 30° C. standard blackbody source by using the fitting correction compensation equation, and the minimum temperature value part is corrected from 29.12° C. to 29.16° C.; the maximum temperature value part is corrected from 31.37° C. to 30.58° C., and measures the actual temperature value of the 40° C. standard blackbody source, the minimum temperature value part is corrected from 39.27° C. to 39.27° C.; the maximum temperature value is corrected from 41.38° C. to 40.59° C., and the relevant values are shown in Table 2.

TABLE 2

Temperature measurement accuracy table after correction without correcting by the correction equation

|   |     | $T_{BB}$ 30° C. |       | $T_{BB}$ 40° C. |       |
|---|-----|-------|-------|-------|-------|
|   |     | UN    | CC    | UN    | CC    |
| B | AVG | 30.00 | 30.00 | 40.00 | 40.00 |
|   | STD | 0.22  | 0.17  | 0.25  | 0.19  |
|   | MIN | 29.12 | 29.16 | 39.27 | 39.27 |
|   | MAX | 31.37 | 30.58 | 41.38 | 40.59 |
|   | MED | 30.01 | 30.02 | 40.02 | 40.02 |

It can be proved by Tables 1 and 2 that the fitting correction compensation equation can effectively inhibit the temperature measurement variation in a short period of time after the shutter actuation, greatly improve temperature drift caused at the single temperature point shutter calibration (optical shutter actuation) that results in that temperature measurement is not accurate, while the present embodiment also proves to be used for different types of thermal imager, the correction and compensation are performed by the fitting correction compensation equation of the present disclosure to achieve the maintenance of temperature measurement stability and high-precision temperature measurement requirements.

In summary, the present disclosure proposes a temperature measurement calibration method without interference of a shutter of a thermal imaging module, fitting calibration is performed by a second-order function to obtain a fitting correction compensation equation, real-time operations can be performed by using a computing chip module loaded with software or a computer or microprocessor, in order to quickly obtain accurate and stable temperature values, the present disclosure does not need to increase the volume of the system, energy consumption or complex hardware insulation device. In the embodiment, the 30° C. and 40° C. blackbody temperatures are measured after the single temperature point shutter calibration (optical shutter actuation) is performed, it causes that the digital response value changes sharply within a short time period, and by using the fitting correction compensation equation, the problems of temperature measurement instability and inaccurate temperature measurement results are effectively improved. Finally, through the verification and comparison of two other groups of thermal imaging modules, it is also proved that the correction and compensation are performed by the fitting correction compensation equation of the present disclosure to achieve high temperature measurement stability and high-precision temperature measurement requirements.

The above embodiments of the disclosure made only by way of example to describe the feature and effect of the disclosure, and it should not be considered as the scope of substantial technical content is limited thereby. Various possible modifications and alternations of the embodiments could be carried out by the those of ordinary skill in the art without departing from the spirit and scope of the disclosure. Therefore, the scope of the disclosure is based on the appended claims.

What is claimed is:

1. A temperature measurement calibration method for a thermal imaging module, comprising steps:
   (S1) obtaining, from a sensing core chip of the thermal imaging module, a plurality of response values generated by measuring a blackbody temperature over a plurality of frame times after starting a shutter of the thermal imaging module, wherein the sensing core chip is at a specific temperature, and the plurality of response values exhibit sharp changes upon starting the shutter, the plurality of response values are divided into a plurality of rising segment response values and a plurality of descending segment response values;
   (S2) performing a fitting regression on the plurality of rising segment response values and the plurality of descending segment response values to derive a rising segment correction response value equation and a descending segment correction response value equation;
   (S3) inputting the plurality of rising segment response values and the plurality of descending segment response values into the rising segment correction response value equation and the descending segment correction response value equation;
   (S4) obtaining a plurality of correction response values for calibrating the plurality of response values of measuring the blackbody temperature; and
   (S5) calibrating the plurality of response values using the plurality of correction response values to eliminate the sharp changes caused by starting the shutter, thereby calibrating a plurality of temperatures measured by the thermal imaging module.

2. The temperature measurement calibration method for a thermal imaging module according to claim 1, wherein the rising segment correction response value equation: $y=C+0.00438x^2-1.20399x+20$, where y is the rising segment correction response value, C is the rising segment response value, and x is the cumulative value of the frame time after starting the shutter.

3. The temperature measurement calibration method for a thermal imaging module according to claim 1, wherein the descending segment correction response value equation: $y1=C1-0.000072(x-180)^2+0.11539(x-180)-50$, where y1 is the descending segment correction response value, C1 is the descending segment response value, and x is the cumulative value of the frame time after starting the shutter.

4. The temperature measurement calibration method for a thermal imaging module according to claim 1, wherein a first frame time to a 180th frame time after starting the shutter is a time interval of the rising segment response value.

5. The temperature measurement calibration method for a thermal imaging module according to claim 1, wherein a 181th frame time to a 1080th frame time after starting the shutter is a time interval of the descending segment response value.

* * * * *